May 13, 1947. W. J. WORKMAN 2,420,635
WINDOW SEAT
Filed Feb. 2, 1946
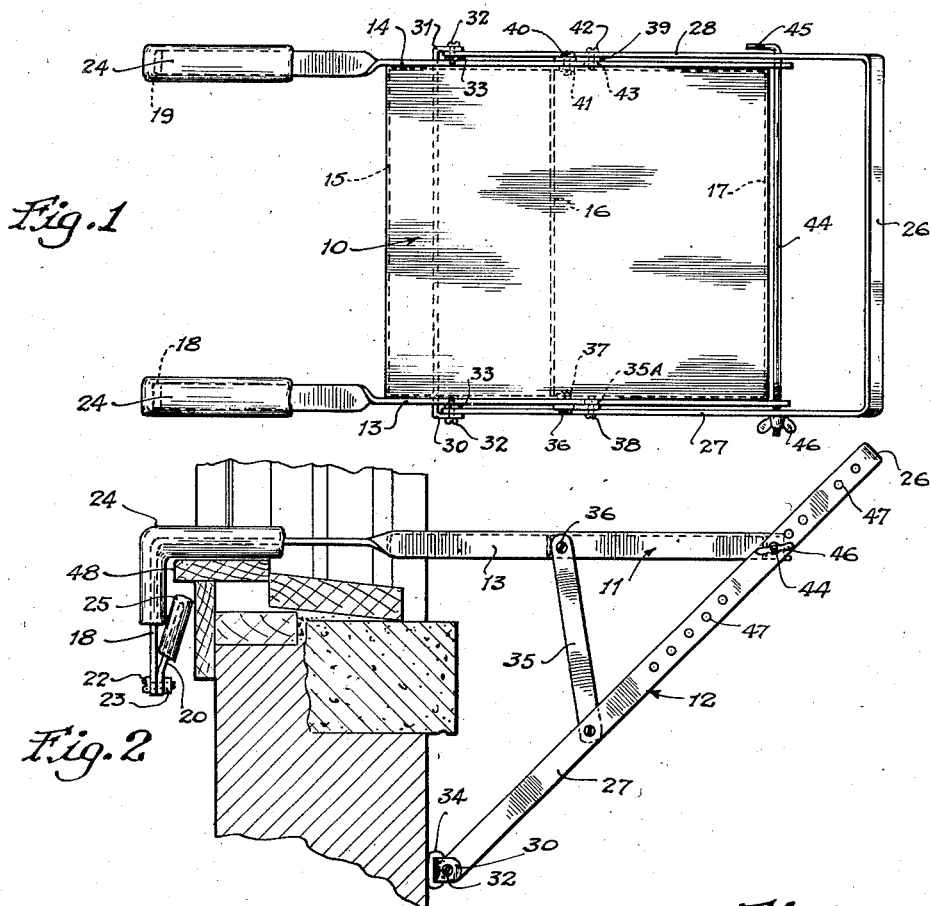
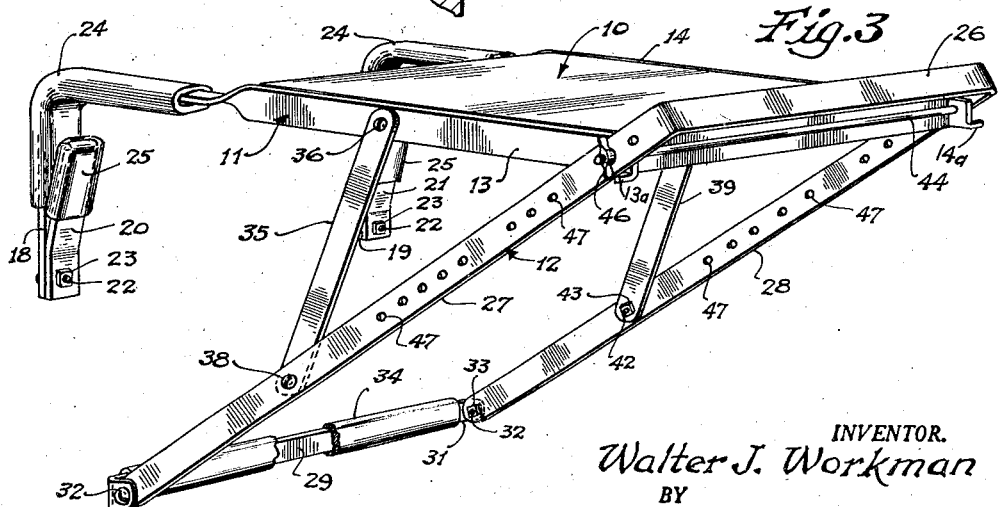
INVENTOR.
Walter J. Workman
BY
Wallace and Cannon
ATTORNEYS Patented May 13, 1947

2,420,635

UNITED STATES PATENT OFFICE 2,420,635

WINDOW SEAT

Walter J. Workman, Chicago, Ill.

Application February 2, 1946, Serial No. 645,052

5 Claims. (Cl. 304—27)

This invention relates to window seats and more specifically to window seats of the character which are supported by the lower portion of a window sill in such a manner that a worker may sit outside of the window.

It is an object of my invention to provide a window seat which may be easily attached to or detached from window sills and which may be safely used to support a worker outside of the window while working on the outside portions of the windows such as during the cleaning and repairing thereof.

It is a further object of my invention to associate a seat with adjustable supporting means in such a manner that the seat may be easily attached to or detached from a window sill and which is positive in supporting action so that it can not slip when in use.

It is a further object of my invention to associate a seat panel with a folding supporting frame in such a manner that a safety rail is provided by the supporting frame so that a person sitting on the seat may not unwittingly slip too far backwardly or outwardly and fall therefrom.

It is a further object of my invention to provide a folding window seat which is adjustable so that it may be used on various standard thicknesses of walls.

Most window sills have a ledge or shaft extending inwardly therefrom and it is a further object of my invention to utilize this construction to promote greater safety than has theretofore been known to the art, by associating a tongue with the supporting frame for my window seat in such a manner that when the window seat is in position on the window frame the tongue is engaged beneath the inwardly extending ledge to provide a positive latching effect which prevents slipping or inadvertent detachment of my window seat from the window sill.

An ancillary object is to provide a window seat having a spring tongue which engages the inner wall of a window sill in tight frictional association.

Several window seat devices have heretofore been known to the art which embody complicated adjusting devices, and one of the bad features of these devices is that adjustment must be made of several locking devices to change the adjustment of the window seat. This is undesirable not only because of the time required to make the several adjustments but also because proper adjustment of the device as a whole depends upon and requires proper coordination of all the adjustments. Unless the adjustments are properly coordinated in such devices the window seat as a whole is out of adjustment so that the seat is slanted or is in an otherwise uncomfortable and undesirable position, and, in many instances, improper coordination of the adjustments results in a dangerous condition because the leverage of the supporting members is not correct so that although the device may appear to be properly adjusted, especially to the inexperienced eye, the device will collapse or slip when a normal load is placed on it. It will be apparent that such devices are dangerous even if they are used by experienced persons because, through slight momentary carelessness, improper adjustment may be made with a resulting fall by a person using the seat, and when it is considered that these devices are, in general, used by people who are not experienced mechanics, or the like, so that improper adjustments may be made not only through carelessness but also through inexperience or lack of knowledge, it will be realized that for both utility and safety it is imperative that simple adjustments be provided. It is an object of my invention to associate the elements of an adjustable folding window seat in such a manner that in making adjustments thereof loosening and resetting of only one locking device is necessary so that when adjustment of the one locking device has been made to accommodate the size wall with which it is desired to use the device and the seat is level when placed in position on this wall there cannot be any error in setting up of the device, nor slipping of the device when it is in use.

Yet another object of this invention is to provide a window seat of the aforesaid character of simple and economical construction and which will be efficient and positive in use.

Other and further objects of the present invention will be apparent from the following description and claims and are illustrated in the accompanying drawings which, by way of illustration shows a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a top plan view of a window seat embodying the principles of my invention;

Fig. 2 is a side elevational view of the window seat shown in Fig. 1;

Fig. 3 is a perspective view of the window seat embodying the principles of my invention and shows the seat panel adjusted to a different position with respect to the folding bracing frame than that shown in Figs. 1 and 2.

The window seat shown in the accompanying drawings embodies a seat panel 10 preferably constructed of sheet metal, a seat supporting frame 11 and a folding bracing frame 12, the structural members of which frames are preferably constructed of strap-iron or strap-steel. The supporting frame 11 comprises side arms 13 and 14 and a transverse supporting member or brace 16, attached thereto by any suitable means such as, for example, by welding. The seat panel 10 has flanges 15 and 17 formed at either end thereof and is positioned between the side arms 13 and 14 and rests upon the transverse supporting member 16 to be supported thereby and is attached to the supporting frame 11 by any suitable means such as welding to the side arms 13 and 14 and the transverse supporting brace 16. One end of each of the side arms 13 and 14 has a leg 18 and 19 formed thereon which extends substantially perpendicular to that portion of the side arm which engages the seat panel 10. Tongues 20 and 21 are attached to the end portions of the legs 18 and 19 respectively by means of bolts 22 and nuts 23. Pads or bumpers 24 are provided on the legs 18 and 19 and pads or bumpers 25 are provided on the tongues 20 and 21 to protect the woodwork of the window sill with which the window seat is associated when the window seat is in use as will be fully set forth hereinafter. The tongues and the pads or bumpers may be made of any suitable material although I prefer to use spring steel for the tongues and rubber for the pads.

The folding bracing frame 12 comprises a substantially U-shaped supporting member having a transverse member 26 with side arms 27 and 28 extending from the ends thereof. The free ends of the side arms 27 and 28 are interconnected by a transverse brace 29 having ears 30 and 31 connected to the free ends of the side arms 27 and 28 respectively by means of bolts 32 and nuts 33. A bumper or pad 34 of any suitable material such as rubber covers the transverse brace 29 for reasons which will be more fully set forth hereinafter. A link 35 is pivotally connected to the side arm 13 of the supporting frame 11 by means of a bolt 36 and a nut 37 and the other end thereof is connected to the side arm 27 of the bracing frame 12 by means of a bolt 38 and a nut 35A and in like manner one end of a link 39 is pivotally connected to the side arm 14 of the supporting frame 11 by means of a bolt 40 and a nut 41 and the other end thereof is connected to the side arm 28 of the folding bracing frame 12 by means of a bolt 42 and a nut 43. The bracing frame 12 is also connected to the seat supporting frame 11 by means of a rod 44 which extends through the side arms 13, 14, 27 and 28 and is held in position by means of a head 45 and a wing nut 46. A series of holes 47 are provided in the side arms 27 and 28 of the bracing frame 12 so that the bracing frame 12 and the supporting frame 11 may be adjusted to various positions with respect to each other, the series of holes 47 being so arranged in order to enable the seat to be adjusted for use with various standard thicknesses of walls.

In the use of my device, the bracing frame 12 and the said supporting frame 11 are first adjusted with respect to each other in accordance with the size of the wall with which the device is to be used by removing the wing nut 46 from the rod 44 and inserting the rod 44 through the side arms 13 and 14 and through the proper holes 47 in the side arms 27 and 28 and then replacing the wing nut 46. The window seat is then positioned on the window sill with the transverse brace 29 swung outwardly so as not to engage the outer surface of the wall and the tongues 20 and 21 are positioned so as to underlie the protruding edge 48 of the window sill and the transverse brace 29 is then swung inwardly again to engage the outer surface of the wall underlying the window sill. When so positioned it will be noted that the seat panel 10 is supported in substantially horizontal position with the legs 18 and 19 in engagement with the inner edge portion of the ledge 48, the tongues 20 and 21 being frictionally engaged with the inner surface of the wall underlying the window sill and latched under the ledge 48, and the transverse brace 29 in engagement with a portion of the outer wall underlying the window sill, substantially as shown in Fig. 2.

It will be noted that lips 13a and 14a, struck from the rear edge portion of the side arms 13 and 14, respectively, underlie the side arms 27 and 28, respectively, of the bracing frame 12, and prevent the bracing frame 12 from falling away from the seat panel 10 when the rod 44 is removed during the adjustment of my seat.

Also it will be noted that when properly adjusted for the thickness of wall with which it is to be used, and when the seat is properly positioned on a window sill, the placing of weight on the seat panel 10 tends to tighten the grip of my device on the wall between the legs 18 and 19 and the transverse brace 29, and that to remove the seat it is first necessary to swing the transverse brace outwardly by hand. Thus it will be seen that my device may be used with a great degree of safety.

Further, it will be noted that the series of holes 47 terminates a sufficient distance below the uppermost limits of the bracing frame 12 that the transverse member 26 extends a sufficient distance above the seat panel 10 in all operative positions of my folding seat that a safety rail is positioned so that a worker sitting on the seat panel 10 can not unwittingly slide too far outwardly on the seat and slip therefrom.

From the foregoing description it will be apparent that the present invention affords a highly advantageous window seat which by reason of its simple and sturdy adjustments may be safely used by ordinary household workers.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. A window seat comprising a seat panel, a seat supporting frame including leg portions formed on one end of said seat supporting frame and extending substantially perpendicularly to the main body of said seat supporting frame, a tongue carried by each of said legs and extending toward said main body of said seat-supporting frame, and a bracing frame attached to said seat-supporting frame.

2. A window seat comprising a supporting frame including legs formed on one end of said supporting frame and extending transversely to the main body thereof, a spring tongue carried by each of said legs, one end of each of said tongues being attached to the free end of one of said legs, the free end of each of said tongues extending inwardly toward the main body of said supporting frame, a seat panel carried by said supporting frame, and a bracing frame attached to said supporting frame.

3. A device of the character described comprising a supporting frame including two side arms and a padded leg attached to one end of each of said side arms, two padded tongues, each of said tongues having one end attached to the free end of one of said legs, the free end of each of said tongues extending toward said supporting frame and being normally spaced from the attached leg, a bracing frame comprising two side arms substantially parallel to each other and having a series of complementary openings formed therein, an upper transverse member interconnecting the upper end portions of said side arms, a padded lower transverse member interconnecting the lower end portions of said side arms, two links, each of said links being attached to one of said side arms of said supporting frame and a corresponding arm of said bracing frame to thereby form an interconnection between said supporting frame and said bracing frame, and means extending through a portion of said supporting frame and through complementary openings in said side arms of said bracing frame to thereby form an interconnection between said supporting frame and said bracing frame.

4. A device of the character described comprising a supporting frame including side arms and a plurality of legs, each of said legs being formed on one end of a corresponding one of said side arms and extending substantially perpendicularly to the main body thereof, tongue means, each of said tongue means having one end attached to the free end of a corresponding one of said legs, the free end of each of said tongue means extending toward said supporting frame and being normally spaced from the attached leg, a bracing frame comprising side arms having a series of complementary openings formed therein, a plurality of links, each of said links being attached to a corresponding one of said side arms of said bracing frame and to said supporting frame to thereby form an interconnection between said supporting frame and said bracing frame, and means extending through a portion of said supporting frame and through complementary openings in said side arms of said bracing frame to thereby form a second interconnection between said supporting frame and said bracing frame.

5. A window seat of the character adapted to rest upon a window sill and engage the underlying supporting wall below, and which comprises a seat member including a supporting frame adapted to rest upon a window sill and a spring member adapted to engage the inner surface of the supporting wall when said supporting frame is in operative position on the window sill, a bracing member comprising two parallel side arms and transverse members interconnecting corresponding end portions of said side arms, two links, each of said links being connected to one of said side arms and to said seat member, and means extending through said side arms and a portion of said seat member to adjustably connect said seat member to said bracing member, said bracing member being adapted to engage the outer surface of the wall when said supporting frame is in operative position on the window sill.

WALTER J. WORKMAN.

REFERENCES CITED

The following references are of record in the file of this patent:

UNITED STATES PATENTS

| Number | Name | Date |
| --- | --- | --- |
| 540,775 | Bailey | June 11, 1895 |
| 657,193 | Fouch | Sept. 4, 1900 |
| 542,648 | Keirsted | July 16, 1895 |
| 829,537 | Mills | Aug. 28, 1906 |
| 2,167,982 | Kerber | Aug. 1, 1939 |
| 2,059,739 | Ment et al. | Nov. 3, 1936 |
| 907,677 | Boost | Dec. 22, 1908 |